United States Patent
Miyamoto et al.

(10) Patent No.: US 6,747,208 B2
(45) Date of Patent: Jun. 8, 2004

(54) SLACK ABSORBER OF WIRE HARNESS (75) Inventors: Masaji Miyamoto, Shizuoka-ken (JP);
Hiroyuki Wakamatsu, Aichi-ken (JP);
Tadashi Muraoka, Kagoshima-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/292,695

(22) Filed: Nov. 13, 2002

(65) Prior Publication Data
US 2003/0100214 A1 May 29, 2003

(30) Foreign Application Priority Data
Nov. 14, 2001 (JP) .................................. P 2001-348946

(51) Int. Cl.[7] .............................................. H02G 3/04
(52) U.S. Cl. .................. 174/68.1; 174/68.3; 174/72 A; 174/135; 439/162; 248/49
(58) Field of Search .................. 174/68.1, 68.3, 174/72 A, 135, 69, 99 G, 72 C; 361/826; 248/49; 439/162

(56) References Cited

U.S. PATENT DOCUMENTS

| | | | |
|---|---|---|---|
| 5,556,059 A | 9/1996 | Maeda et al. ............... | 248/49 |
| 5,824,960 A | 10/1998 | Markling .................... | 174/135 |
| 6,070,931 A | 6/2000 | Yamaguchi et al. ..... | 296/146.7 |
| 6,481,547 B2 * | 11/2002 | Tsukamoto ............... | 191/12 R |
| 6,515,229 B2 * | 2/2003 | Aoki et al. ............... | 174/72 A |
| 6,570,093 B2 * | 5/2003 | Doshita et al. ........... | 174/72 A |

FOREIGN PATENT DOCUMENTS

EP   1 138 555 A2   10/2001

* cited by examiner

Primary Examiner—Dhirubhai R. Patel
(74) Attorney, Agent, or Firm—Finnegan, Henderson, Farabow, Garrett & Dunner, L.L.P.

(57) ABSTRACT

In a slack absorber of wire harness structured such that a leaf spring (29) to which a proximal portion (129) is mounted and a wire harness (32) arranged along the leaf spring (29) within a protector case (21), a support portion (26) having a clamp groove (26a) to which the proximal portion (129) of the leaf spring (29) is inserted is provided in a protector base (23), a pressing-portion (27) pressing a proximal portion (29a) of the leaf spring (29) which is clamped by the support portion (26) is provided in a protector cover (24), and the proximal portion (29a) of the elastic member (29) is fixed to the support portion (26) and the pressing portion (27) in a state in which the protector base (24) and the protector cover (23) are combined.

4 Claims, 7 Drawing Sheets

SLACK ABSORBER OF WIRE HARNESS

BACKGROUND OF THE INVENTION

The present invention relates to a slack absorbing apparatus which absorbs a slack in a wire harness caused by movement of a movable member which receives the wire harness.

For example, an electronic equipment such as a power window motor, a door lock unit, a speaker and the like is mounted within a slide door which is used in a vehicle such like a minivan. Since it is necessary to always feed an electric power to the electronic equipment from a side of a vehicle body, and give and receive a control signal between the electrical equipment and a vehicle body, a wire harness is arranged between the side of the vehicle body and a side of the slide door. It is necessary to arrange the wire harness in this portion in such a manner as to correspond to an opening and closing operation of the slide door, and a slack absorber of wire harness is used as a part thereof.

Figure 1:
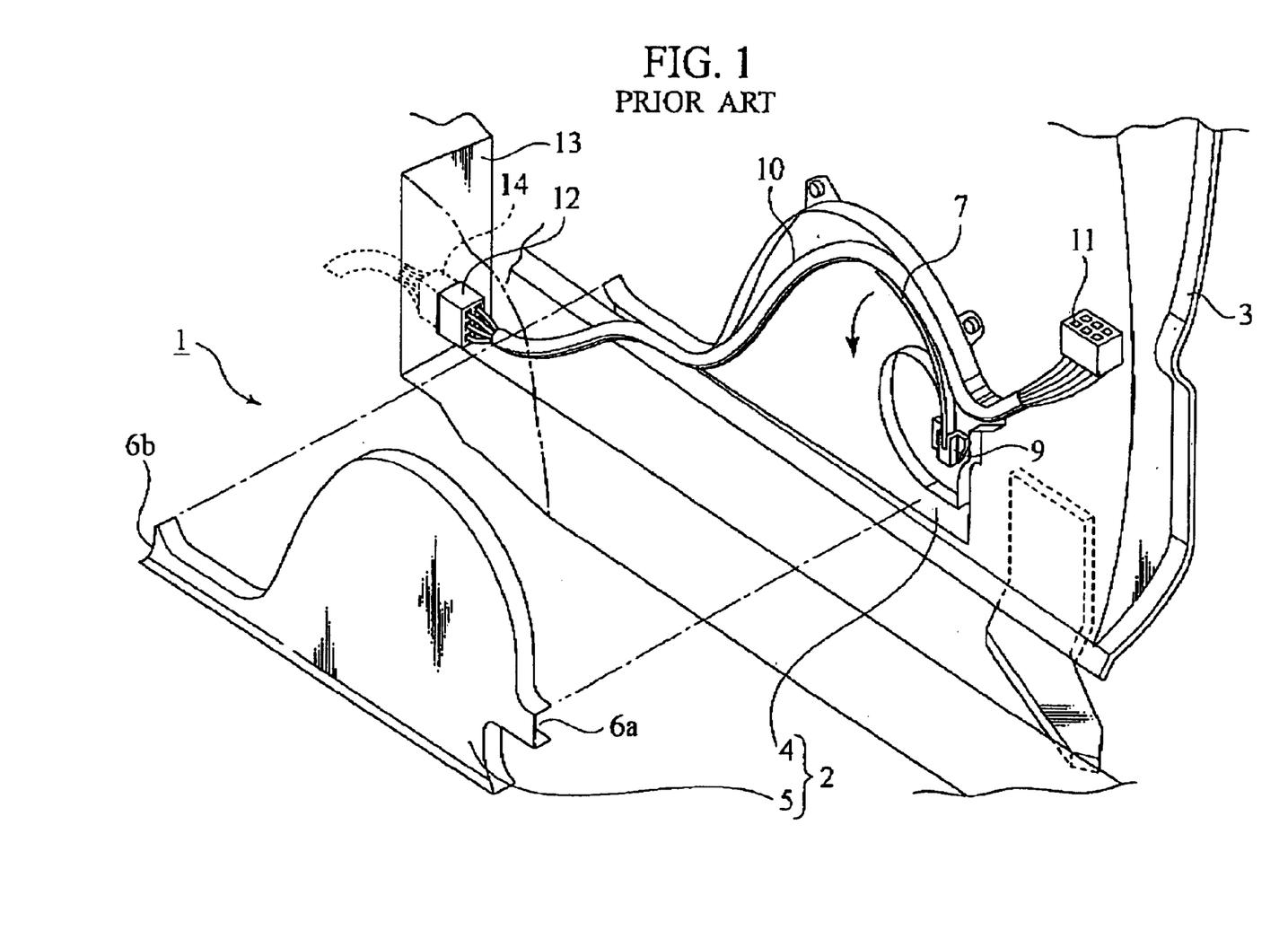
FIG. 1 is an exploded perspective view of a wire harness deflection absorbing apparatus according to a conventional embodiment.
Figure 2:
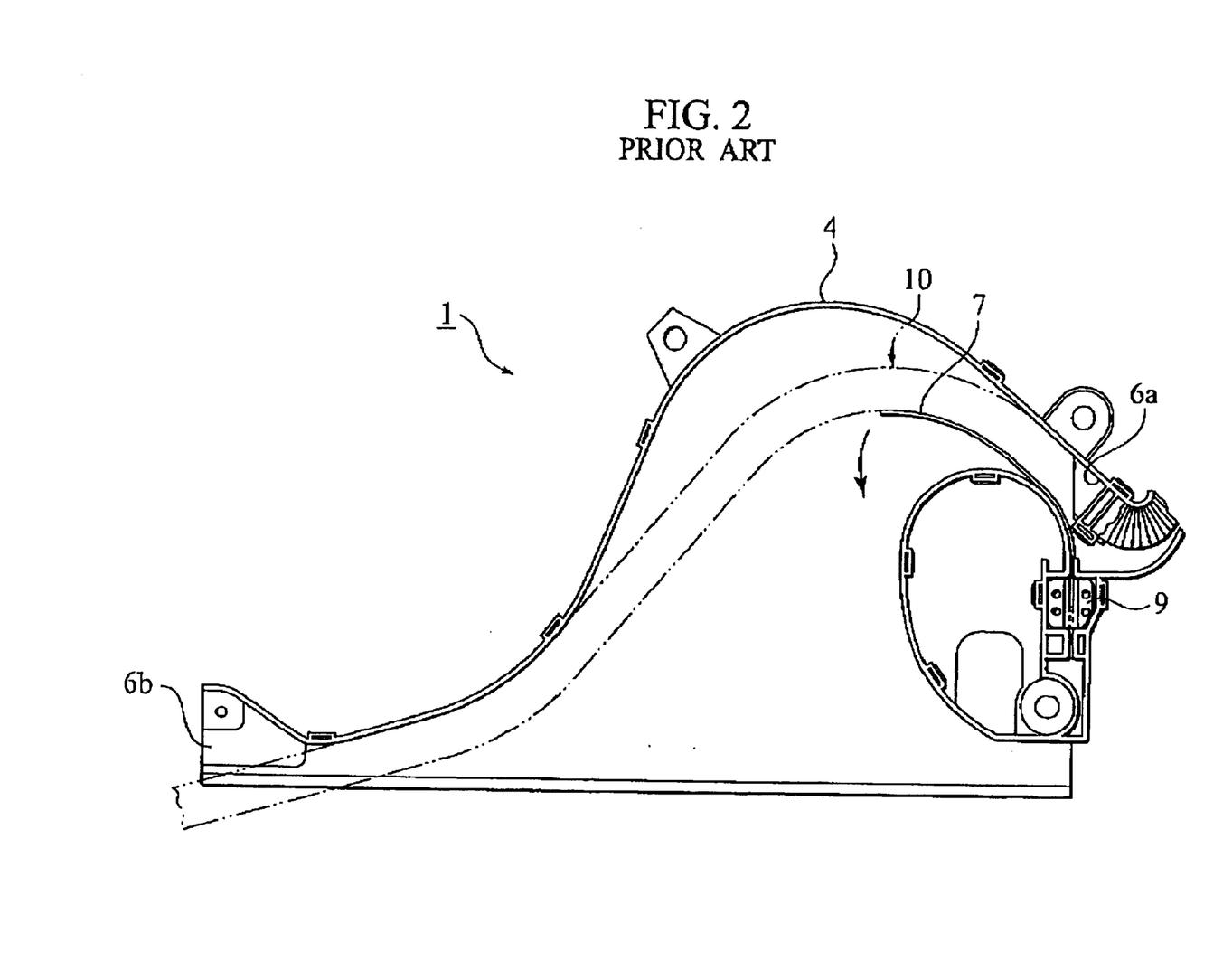
FIG. 2 is a front elevational view of a protector base according to the conventional embodiment.

As a relevant slack absorber of wire harness, there is an apparatus described in Japanese Patent Application No. 2001-76514 which is made by the inventors of the present patent. A slack absorber of wire harness 1 has a synthetic resin protector case 2 having a shape in which a top surface side bulges in a circular arc shape, as shown in FIGS. 1 and 2. This protector case 2 is constituted by a protector base 4 fixed to a slide door 3, and a protector cover 5 assembled therein.

As shown in FIGS. 1 and 2, wire harness entrance ports 6a and 6b are respectively provided in both end portions of the protector case 2, and a lead spring (an elastic member) 7 is arranged within the protector case 2. A proximal end portion 7a of the leaf spring 7 is inserted into a clamp groove 8a of a clamp portion 8 which is integrally provided in the protector base 4, and boss portions 8b are crushed according to an ultrasonic deposition, whereby a metal fixing device 9 is fixed to the clamp portion 8. The metal fixing device 9 presses the proximal end portion 7a of the leaf spring 7 so as to prevent the proximal end portion 7a of the leaf spring 7 from coming off from the clamp groove 8a. Thereby, the leaf spring 7 is arranged in such a manner as to freely deflect around the proximal end portion 7a corresponding to a fixed supporting point.

A wire harness 10 is arranged within the protector case 2 along the leaf spring 7, and both end sides of the wire harness 10 are respectively introduced out of the case through the wire harness entrance ports 6a and 6b. A connector 11 in one end side of the wire harness 10 introduced out of the protector case 2 is connected to a connector (not shown) in a side of the slide door 3, and a connector 12 in another end side of the wire connector 10 is connected to a connector 14 in a side of a vehicle body 13.

In the structure mentioned above, when a pulling force is applied to the wire harness 10 based on the opening operation of the slide door 3, the leaf spring 7 deflects and deforms in a direction of an arrow in FIGS. 1 and 2, and another end side of the wire harness 10 is pulled out from the protector case 2. Further, when the pulling force of the wire harness 10 is lost by the closing operation of the slide door 3, the leaf spring 7 is deflected in an opposite direction to the direction of the arrow in FIGS. 1 and 2 so as to be restored, and another end side of the wire harness 10 is pulled back within the protector case 2. According to the movement of the wire harness 10 as mentioned above, the slack of the wire harness 10 caused by opening and closing operation of the slide door 3 is absorbed.

SUMMARY OF THE INVENTION

Figure 3:
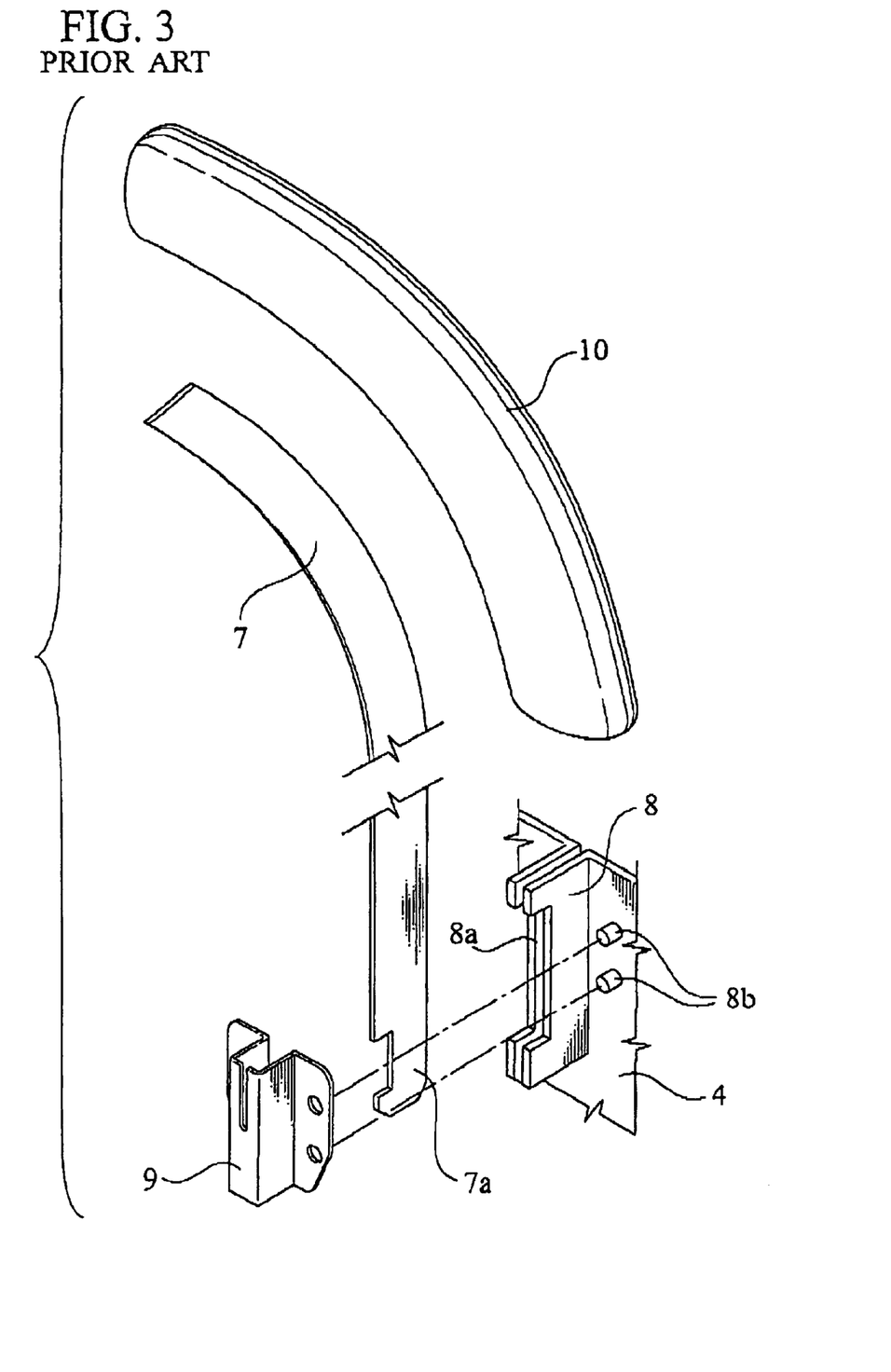
FIG. 3 is an exploded perspective view of a main portion which shows fixing of a proximal end portion in a leaf spring according to the conventional embodiment.

However, in the slack absorber of wire harness 1 mentioned above, the proximal end portion 7a of the leaf spring 7 is fixed to the clamp portion 8 by using the fixing device 9 as shown in FIG. 3, therefore, the fixing device 9 is required in addition to the protector case 2, and the number of the parts is increased by just that much and a cost is increased. Since the fixing device 9 is fixed by ultrasonic depositing the boss portion 8b of the clamp portion 8, there is required a space exclusive for mounting the boss portion 8b.

The present invention is made for the purpose of solving the problems mentioned above, and the present invention can provide a slack absorber of wire harness in which an elastic member can be securely mounted without using a fixing device. According to the present invention, it is possible to achieve a cost reduction and a space saving of a mounting space based on reduction of parts.

According to a first technical aspect of the present invention, a slack absorber of wire harness is provided with a protector case 21 obtained by assembling a protector base and a protector cover, and receives a planar elastic member having a fixed proximal portion and a wire harness arranged along a part of the elastic member within the protector case, and a part of the elastic member deflects in correspondence to a tensile force applied to the wire harness. The apparatus is characterized in that the absorber is provided with a support portion formed in any one of the protector base and the protector cover, the support portion by which the proximal portion of the elastic member is clamped, and a pressing portion formed in any another of the protector base and the protector cover, capable of engaging with the support portion and pressing the proximal portion of the elastic member from an edge direction.

According to a second technical aspect of the present invention, the absorber is further provided with a lock portion formed in any one of the support portion and the pressing portion, and a locked portion formed in any another of the support portion and the pressing portion and engaged with the lock member.

According to a third technical aspect of the present invention, a mounting structure of a wire tensioner for a protection case of a wire harness is provided. The protection case is an assembly including a first protection member and a second protection member, with the wire harness passing through the protection case. The wire tensioner has a stripe shape, and also has an elasticity in a part thereof. A distal portion of the wire tensioner engages with the wire harness to apply a tension, and a first cut and a second cut is formed in each edge of a proximal portion of the wire tensioner. A first support portion is formed in the first protection member, the proximal portion of the wire tensioner being mounted on the first support portion, and a second support portion is formed in the second protection member such that the second support portion is capable of engaging with the first support portion. One of the first cut and the second cut engages the second support portion when the first protection member and the second protection member have been combined.

DESCRIPTION OF THE PREFERRED EMBODIMENT

A description will be given of an embodiment according to the present invention with reference to the accompanying drawings.

Figure 4:
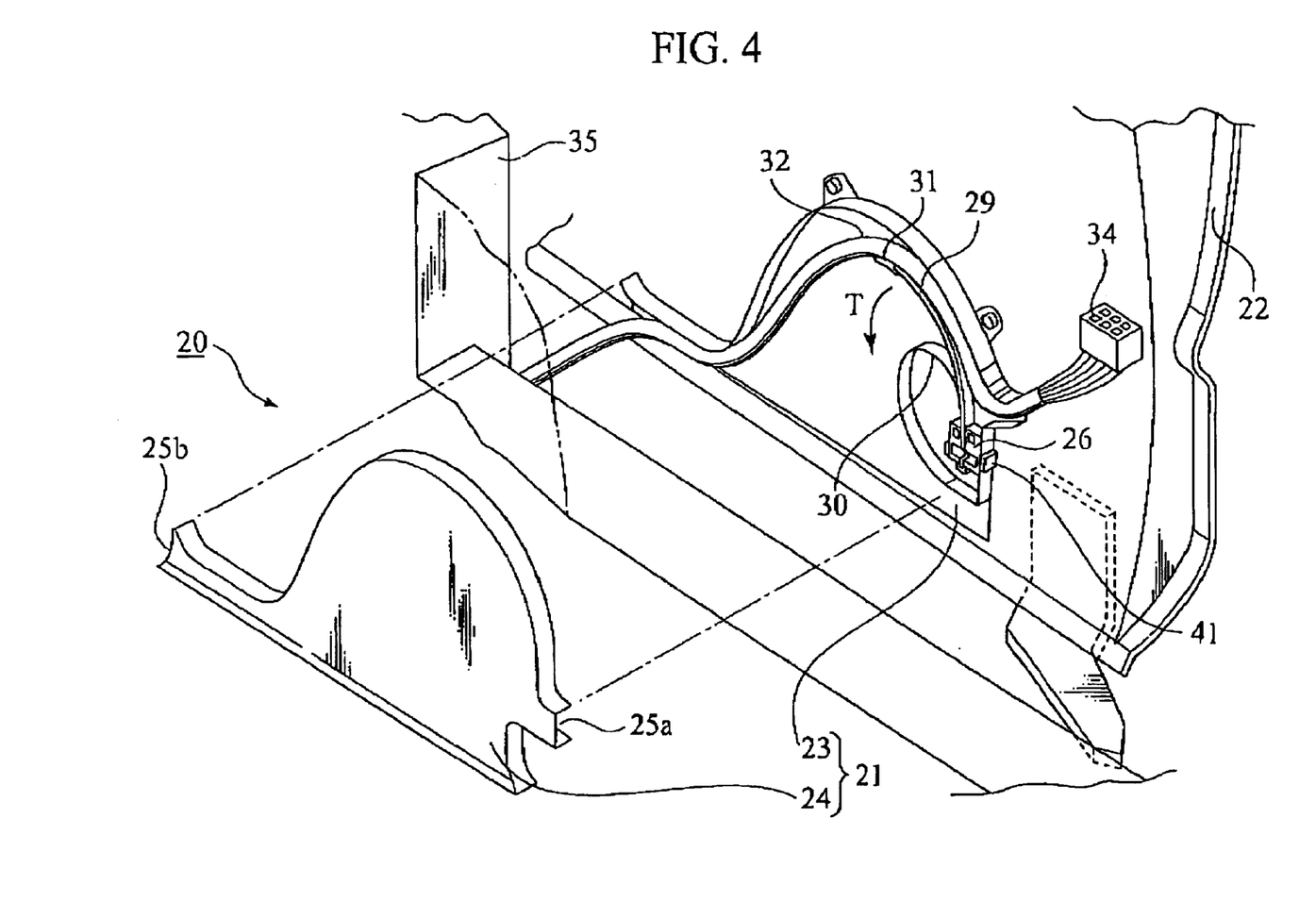
FIG. 4 is an exploded perspective view of a wire slack absorbing apparatus and shows one embodiment according to the present invention.
Figure 5:
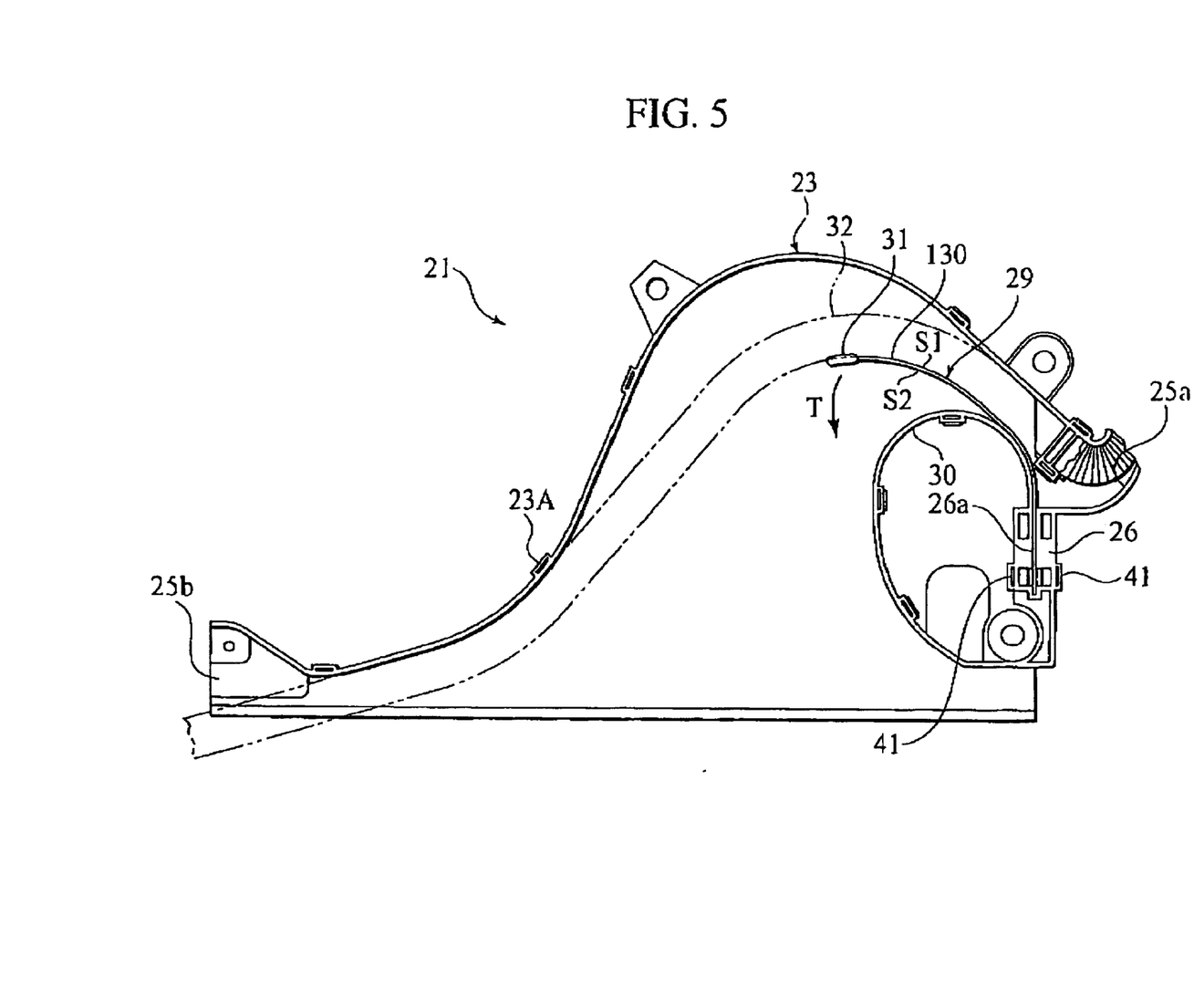
FIG. 5 is a front elevational view of a protector base and shows the embodiment according to the present invention.
Figure 6:
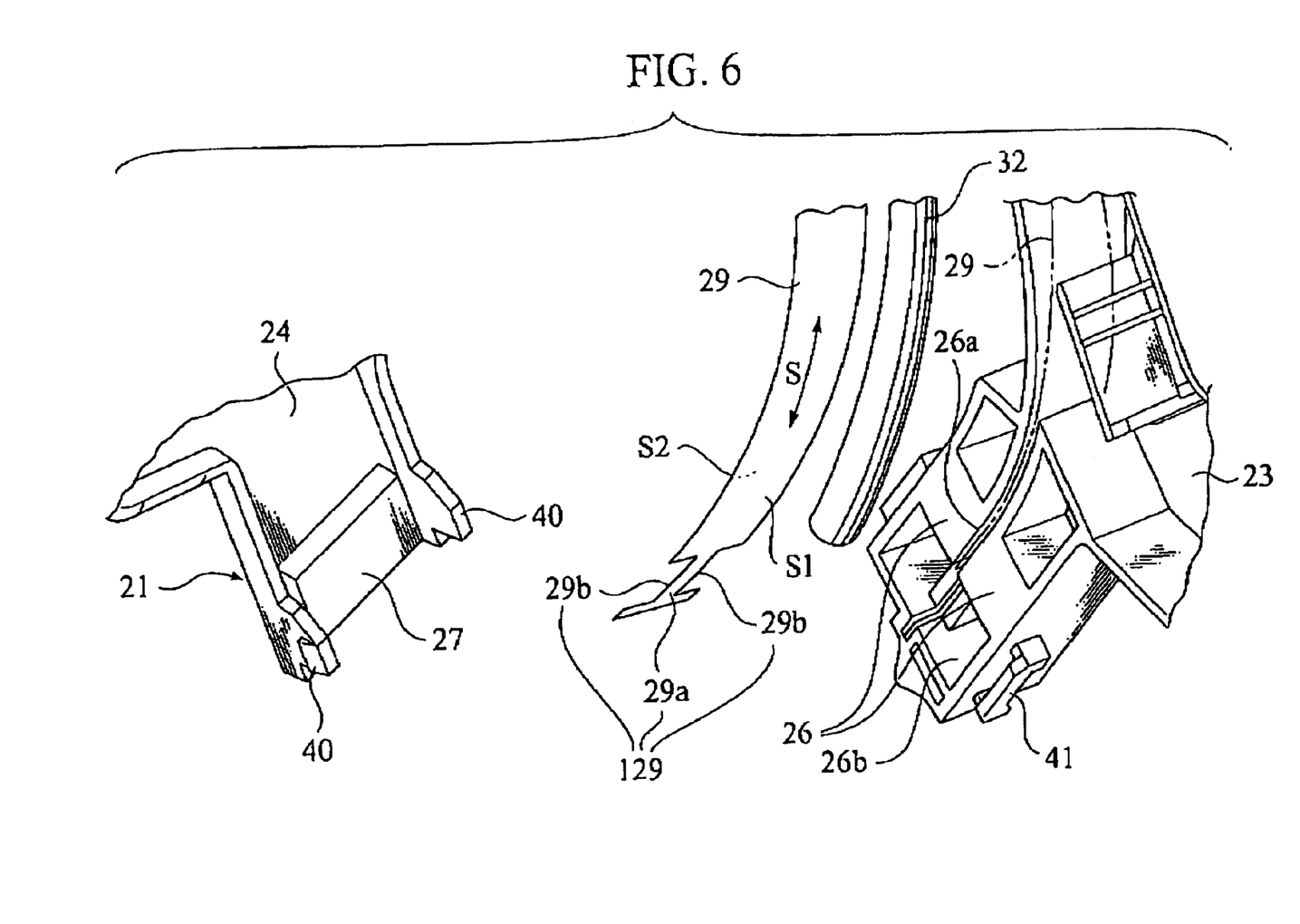
FIG. 6 is an exploded perspective view of a main portion which shows an engagement structure of a proximal portion in a leaf spring, and shows the embodiment according to the present invention.
Figure 7A:
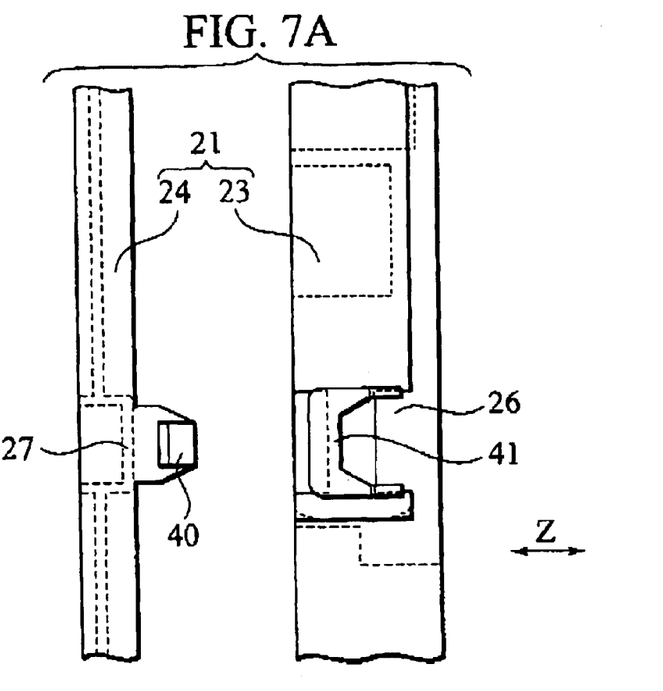
FIG. 7A is an exploded side elevational view of a main portion of an engagement portion of the proximal portion in the leaf spring.
Figure 7B:
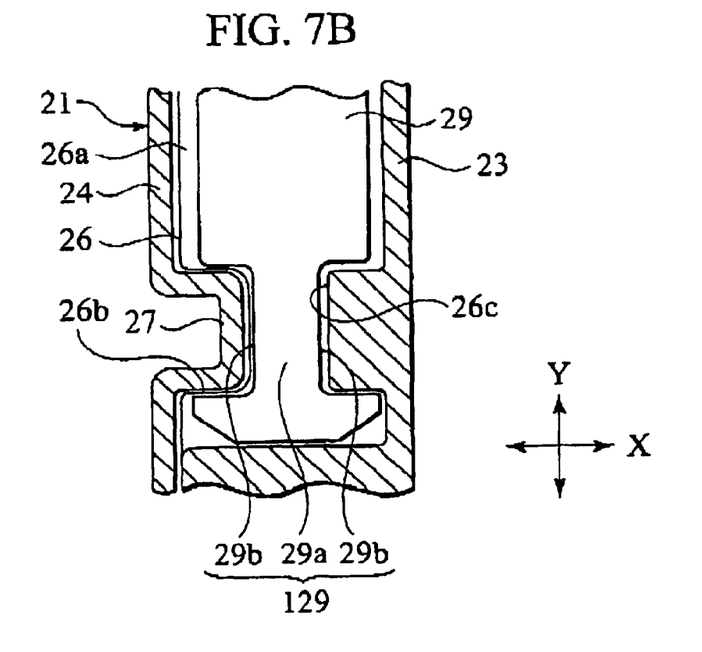
FIG. 7B is a cross sectional view of a main portion of the engagement portion of the proximal portion in the leaf spring.

FIGS. 4 to 7 show an embodiment according to the present invention, in which FIG. 4 is an exploded perspective view of a wire slack absorber 20, FIG. 5 is a front elevational view of a protector base which is used in the apparatus 20, FIG. 6 is an exploded perspective view of a main portion which shows a fixed portion of a proximal portion in a leaf spring used in the apparatus 20, FIG. 7A is an exploded side elevation view of a main portion of the fixed portion of the proximal portion in the leaf spring, and FIG. 7B is a cross sectional view of a main portion of the fixed portion of the proximal portion in the leaf spring.

As shown in FIGS. 4 to 7, a slack absorber of wire harness 20 has a protector case 21 having a shape in which an upper surface side bulges in a substantially circular arc shape, and the protector case 21 is constituted by assembling a synthetic resin protector base 23 being fixed to a slide door 22 and a synthetic resin protector cover 24 covering the protector base 23. In various embodiments, the protector base 23 may be referred to as a first protection member 23, and the protector cover 24 may be referred to as a second protection member 24.

As shown in FIGS. 4 and 5, the protector base 23 and the protector cover 24 are locked by a case lock means 23A (an upper protector base 23 is only illustrated for reasons of illustration) in a state in which outer edge ends thereof are put face to face, thereby being combined. The protector case 21 is a casing which defines a space capable of receiving at least one branch of wire harness 32 in an inner portion. Entrance ports 25a and 25b for the branch of wire harness are respectively provided in sides of end portions of the protector case 21, and a support portion 26 is integrally formed in a protruding manner on an inner surface of the protector base 23. This support portion 26 has a slit-shaped clamp groove 26a which engages a leaf spring 29 as a planar elastic member on a surface thereof (S1, S2). In the strip-shaped planar spring member 29, at least a distal portion 130 thereof has an elasticity and supports the wire harness in a direction normal to a surface (S1, S2) of the leaf spring, the strip-shaped spring 29 supports the wire harness as a load by engaging a proximal portion 129 by means of the clamp groove 26a. Further, the support portion 26 has a recess portion 26b having a rectangular opening in a part of the clamp groove 26a. The recess portion 26b engages with a pressing portion 27 so as to prevent the spring member 29 from shifting in the other directions than the surface direction thereof and coming off in a longitudinal direction (S) thereof. Further, the block-like pressing portion 27 is integrally formed in a protruding manner at a position opposing the recess portion 26b in the support portion 26 of the protector cover 24 so as to be capable of engaging with each other. In the present embodiment, the proximal portion 129 is provided in the proximal end portion of the leaf spring, however, may be provided at the other positions. In various embodiments, the support portion 26 may be referred to as a first support portion 26, and the pressing portion 27 may be referred to as a second support portion 27.

The leaf spring 29 as a wire tensioner arranged within the protector case 21 is a strip member which extends in a direction of S in an elongated manner. The leaf spring 29 has a flexibility at least in the distal portion 130 or in a whole portion, and cuts 29b and 29b are formed in both edges of the proximal portion of the leaf spring 29 in a width direction (X) thereof in which a first cut 29b on one side and a second cut 29b on opposite side. The side of the proximal portion 29a in which the respective cuts 29b are formed is inserted to the clamp groove 26a of the support portion 26. The bottom of the clamp groove has a raise 26c formed with rectangular section as shown in FIG. 7B for conformal engagement with the cut 29b to be able to be pressed. As shown in FIG. 7B, the pressing portion 27 of the protector cover 24 is inserted into the recess portion 26b of the support portion 26 in the protector cover 24. As a result, the proximal portion 29a of the leaf spring 29 is pressed by the pressing portion 27 for hold so as not to get out of the clamp groove 26a. The structure is made such that it is possible to securely prevent the leaf spring 29 from coming off in the longitudinal direction (S) by pressing the proximal portion 29a of the leaf spring 29 in a state in which the pressing portion 27 is inserted to the portion of the cuts 29b in the leaf spring 29. As a result, the leaf spring 29 is arranged so that the distal portion 130 freely deflects in a direction (T) substantially perpendicular to the surface of the leaf spring around the proximal portion 29a corresponding to a fixed supporting point. Further, a cap 31 having a low friction coefficient is attached to a free end of the leaf spring 29, whereby the branch of wire harness 32 can smoothly slide without being damaged by the free end side of the leaf spring 29.

A spring deflection curing wall 30 having a predetermined curved shape is integrally formed in a protruding manner at a predetermined position on an inner surface of the protector base 23, and the leaf spring 29 can securely perform a predetermined deflection along the spring deflection curing wall 30.

As shown in FIGS. 6 and 7A, a pair of lock members (lock means) 40 and 40 are integrally formed in a protruding manner in both sides near the pressing portion 27 of the protector cover 24. A pair of locked portions (lock means) 41 and 41 are integrally formed in a protruding manner on side surfaces of the support portion 26 in the protector base 23, and are arranged so as to be capable of being engaged with a pair of lock members 40. These respective lock members 40 and respective locked portions 41 are locked together with the other case lock means 23A, 23A formed in the protector cover 24 and the protector base 23 in a state in which the protector base 23 and the protector cover 24 are put face to face, whereby the protector base 23 and the protector cover 24 are combined.

As shown in FIGS. 4 and 5, the branch of wire harness 32 is arranged along the leaf spring 29 within the protector case 21, and both end sides of the branch of wire harness 32 are respectively introduced out of the case through the wire entrance ports 24a. A connector 34 in one end side of the branch of wire harness 32 introduced out of the protector case 21 is connected to a connector (not shown) in the side of the slide door 22, and a connector (not shown) in another end side of the branch of wire harness 32 is connected to a connector (not shown) in the side of the vehicle body 35a.

In the case of assembling the slack absorber 20 having the structure mentioned above, first, the proximal portion 29a of the leaf spring 29 is inserted to the clamp groove 26a of the protector base 23 so as to achieve a provisional mounting state. The branch of wire harness 32 is arranged within the protector base 23 so as to be along the leaf spring. When putting the protector base 23 and the protector cover 24 face to face in the state in which the leaf spring 29 is provisionally mounted and the branch of wire harness 32 is arranged at the predetermined position, the case lock means 23A, 23A, and the lock members 40 and the locked portions 41 as each an another lock means are locked respectively. Accordingly, the protector base 23 and the protector cover 24 are assembled with each other so as to be combined. Further, in this assembling state, the proximal portion 29a of the leaf spring 29 clamped by the support portion 26 within the protector base 23 is securely engaged so that the pressing portion 27 of the protector cover 24 does not come off from the clamp groove 26a.

When the slack absorber 20 is mounted within the slide door 22, and the pulling force is applied to the branch of wire harness 32 caused by opening motion of the slide door 22, the leaf spring deflects in the direction (T) normal to the surface thereof as shown in FIGS. 4 and 5, and another end side of the branch of wire harness 32 is pulled out from the protector case 21. When the pulling force of the branch of wire harness 32 is reduced or lost according to the closing motion of the slide door 22, the leaf spring 29 deflects in an opposite direction to that in the opening motion of the door so as to be restored, and another end side of the branch of wire harness 32 is pulled back within the protector case 21. According to the movement of the branch of wire harness 32 mentioned above, the slack of the branch of wire harness 32 caused by the opening and closing operation of the slide door 22 is absorbed.

In the slack absorber 20 absorbs the slack of the branch of wire harness 32 caused by the opening and closing motion of the slide door 22 as mentioned above. Therefore, the proximal portion 129 is fixed within the protector case 21 by inserting the proximal portion 129 of the leaf spring 29 to the clamp groove 26a of the support portion 26 and assembling the protector base 23 with the protector cover 24, the metal fixing device is not required, the number of the parts can be reduced by just that much so as to intend to achieve a cost reduction, and it is possible to intend to save space for mounting. A complicated operation such as assembling the metal fixing device or the like is not required, it is possible to reduce number of assembling steps, and it is possible to intend to achieve a rapid motion in the assembling operation.

A pair of locked portions 41 and 41 is integrally formed in a protruding manner on the side surfaces of the support portion 26 in the protector base 23, and a pair of lock members 40 and 40 is integrally formed in a protruding manner on the side surfaces of the pressing portion 27 in the protector cover 24. Accordingly, it is possible to more firmly keep the assembling state between the protector base 23 and the protector cover 24 in the portion to which the proximal portion 29a of the leaf spring 29 is fixed, and it is possible to more securely and stably fix the leaf spring 29 by the support portion 26 and the pressing portion 27.

In this case, in the embodiment mentioned above, the locked portions 41 is provided on the side surfaces of the support portion 26 in the protector base 23, and the lock members 40 are provided near the pressing portion 27 in the protector cover 24, however, the lock members 40 may be provided near the support portion 26 in the protector base 23, and the locked portions 41 may be provided near the pressing portion 27 in the protector cover 24. Furthermore, the support portion 26 is provided in the protector cover 23, and the pressing portion 27 is provided in the protector cover 24, however, the support portion 26 may be provided in the protector cover 24, and the pressing portion 27 may be provided in the protector base 23.

As described above, according to the first technical aspect of the present invention, the structure is made such that the proximal portion of the elastic member is fixed by the clamp portion which is provided in any one of the protector base and the protector cover, and the pressing portion which is provided in any another thereof, it is possible to simply and securely fix the elastic member within the protector case by assembling the protector base and the protector cover after clamping the proximal portion of the elastic member by the clamp portion. Accordingly, it is possible to fix the elastic member without using the fixing device, and it is possible to reduce the number of the parts by just that much so as to intend a cost saving, and it is possible to intend to save the space for mounting.

According to the second technical aspect of the present invention, the lock means constituted by the lock members and the locked portions is provided near the clamp portion and near the pressing portion. Therefore, it is possible to make the assembling state between the protector base and the protector cover in the portion to which the proximal portion of the elastic member is fixed firm, and it is possible to more securely fix the elastic member by the clamp portion and the pressing portion.

This application claims benefit of priority under 35USC §119 to Japanese Patent Applications No. 2001–348946, filed on Nov. 14, 2001, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A slack absorber of wire harness, the absorber having a protector case being assembled by combining a protector base and a protector cover, and receiving a planar elastic member having a fixed proximal portion and at least one branch of wire harness arranged along a part of the planar elastic member within the protector case, and a part of the planar elastic member deflecting in correspondence to a tensile force applied to the branch of wire harness, comprising:

a support portion formed in any one of the protector base and the protector cover, the proximal portion of the planar elastic member being clamped by the support portion; and a pressing portion formed in any another of the protector base and the protector cover and capable of engaging with the support portion, the pressing portion pressing the proximal portion of the elastic planar member from an edge direction thereof.

2. A slack absorber according to claim 1, further comprising:

a first lock portion formed in any one of the support portion and the pressing portion; and a second locked portion formed in the other of the support portion and the pressing portion, wherein the second locking portion is configured to engage the first lock portion.

3. A slack absorber according to claim 1 or 2, wherein the support portion is formed in the protector base, and the pressing portion is formed in the protector cover.

4. A mounting structure of a wire tensioner for a protection case of a wire harness, the protection case being an assembly of a first protection member and a second protection member, and the wire harness passing through the protection case, comprising:

the wire tensioner having a strip shape, the wire tensioner having an elasticity in a part thereof, a distal portion of the wire tensioner engaging with the wire harness for applying a tension, and a first cut and a second cut each being formed in each edge of a proximal portion in the wire tensioner;

a first support portion formed in the first protection member, the proximal portion of the wire tensioner being mounted to the first support portion; and a second support portion formed in the second protection member in such a manner as to be capable of engaging with the first support portion, one of the first cut and the second cut being engaged by the second support portion in a state the first protection member and the second protection member being combined.

* * * * *

UNITED STATES PATENT AND TRADEMARK OFFICE
CERTIFICATE OF CORRECTION

| | |
|---|---|
| PATENT NO. | : 6,747,208 B2 |
| APPLICATION NO. | : 10/292695 |
| DATED | : June 8, 2004 |
| INVENTOR(S) | : Masaji Miyamoto et al. |

It is certified that error appears in the above-identified patent and that said Letters Patent is hereby corrected as shown below:

Title Page, Item (57), in the Abstract, line 7, "pressing-portion" should read --pressing portion--.

Signed and Sealed this

Twenty-second Day of January, 2008

JON W. DUDAS
*Director of the United States Patent and Trademark Office*